UNITED STATES PATENT OFFICE.

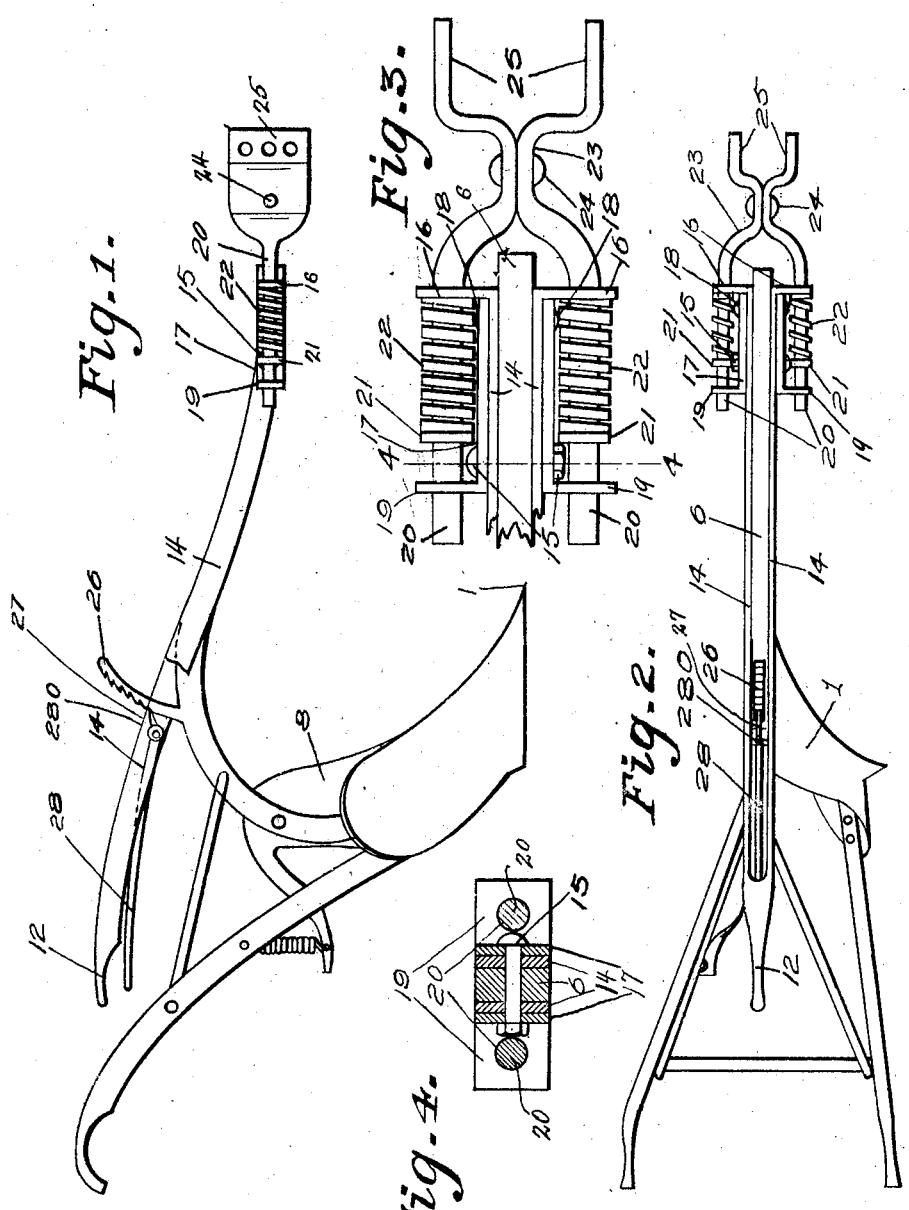

JESSE THOMAS CAMPBELL, OF ELBRIDGE, TENNESSEE.

PLOW.

1,335,276.      Specification of Letters Patent.      Patented Mar. 30, 1920.

Application filed October 4, 1919. Serial No. 328,515.

*To all whom it may concern:*

Be it known that I, JESSE T. CAMPBELL, a citizen of the United States, residing at Elbridge, in the county of Obion and State of Tennessee, have invented a new and useful Plow, of which the following is a specification.

The device forming the subject matter of this application is a plow, and one object of the invention is to provide a novel form of yieldable draft rigging for the plow.

A further object of the invention is to provide novel means whereby the distance which the plowshare penetrates the ground may be regulated.

In the accompanying drawings:—

Figure 1 shows in side elevation a plow constructed in accordance with the invention; Fig. 2 is a top plan; Fig. 3 is a detail enlarged from Fig. 2; Fig. 4 is a cross section on the line 4—4 of Fig. 3.

The numeral 1 denotes a plow share carried by a beam 6 and provided with a cleaner 8.

The numeral 12 marks a lever comprising arms 14. A pivot member 15, carried by the beam 6, is engaged with the arms 14 and forms a fulcrum for the lever 12. The arms 14 have outwardly extended forward ends 16. Brackets 17 are mounted on the outer surfaces of the arms 14 at the forward ends thereof. The forward ends of the brackets 17 abut against the ends 16 of the arms 14 of the lever 12. The brackets 17 are held on the arms 14 by the pivot member 15, and by securing elements 18. The rear ends of the brackets 17 are outwardly extended as shown at 19. Rods 20 are mounted to reciprocate longitudinally in the ends 16 of the arms 14 and in the ends 19 of the brackets 17. The rods 20 carry abutments 21. Compression springs 22 surround the rods 20 and abut at their ends against the parts 21 and 16. In front of ends 16 of the arms 14, the rods 20 converge, as shown at 23, and are united by a securing member 24. In front of the securing member 24 the rods diverge, the rods being broadened to form a clevis 25.

The numeral 26 denotes a keeper upstanding from the plow beam 6 and fixed thereto. A latch 27 is pivotally mounted between the arms 14 of the lever 12 and is adapted to coöperate with the keeper 26, the pivotal mounting of the latch being designated by the numeral 280. The latch 27 is manipulated by a rearwardly extended handle 28.

The latch 27 may be moved out of engagement with the toothed keeper 26 on the plow beam by means of the handle 28. Then the lever 12 may be swung vertically on its fulcrum 15, so as to regulate the depth to which the plow share penetrates the ground. When draft is applied to the clevis 25, the rods 20 slide forwardly in the parts 16 and 19, the springs 22 being put under compression. In this way a yieldable draft for the plow is provided.

Having thus described the invention, what is claimed is:

1. In a device of the class described, a beam; a lever comprising arms located on opposite sides of the beam and having outwardly extended forward ends; brackets extended along the arms and having outwardly extended rear ends; a pivot member uniting the arms with the beam for vertical swinging movement, and connecting the brackets with the arms; rods slidable in the ends of the arms of the lever and in the ends of the brackets; abutments on the rods; compression springs interposed between the abutments and the said ends of the arms; and last means on the forward ends of the rods.

2. In a device of the class described, a beam; a lever comprising arms located on opposite sides of the beam, the arms having outwardly extended forward ends; means for pivotally connecting the arms with the beam; rods slidable in the ends of the arms; abutments on the rods; compression springs interposed between the abutments and the ends of the arms; and a draft means assembled with the forward ends of the rods.

In testimony that I claim the foregoing as my own, I have heretofore affixed my signature in the presence of two witnesses.

JESSE THOMAS CAMPBELL.

Witnesses:
W. T. SHIRES,
T. C. DILLINGHAM.